United States Patent
Tsuchiya et al.

(10) Patent No.: US 7,164,957 B2
(45) Date of Patent: Jan. 16, 2007

(54) WIRE HARNESS DESIGN AIDING APPARATUS, METHOD AND COMPUTER READABLE RECORDING MEDIUM STORING PROGRAM

(75) Inventors: Shinji Tsuchiya, Kosai (JP); Kohki Nagakura, Kosai (JP); Takeshi Hasegawa, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/737,759

(22) Filed: Dec. 18, 2003

(65) Prior Publication Data
US 2004/0176862 A1 Sep. 9, 2004

(30) Foreign Application Priority Data
Dec. 18, 2002 (JP) ............ P2002-366826
Nov. 13, 2003 (JP) ............ P2003-383433

(51) Int. Cl.
*G06F 19/00* (2006.01)
(52) U.S. Cl. .......... 700/97; 700/182; 345/419; 345/420; 174/72 A; 702/33
(58) Field of Classification Search ........ 700/83, 700/97, 182; 345/419, 420; 702/33; 703/1, 703/13; 706/919; 174/72 A
See application file for complete search history.

(56) References Cited

U.S. PATENT DOCUMENTS 5,506,950 A 4/1996 Hughes et al.

6,272,387 B1 * 8/2001 Yoon ............... 700/83
6,842,173 B1 * 1/2005 Sakakura et al. ........ 345/419

FOREIGN PATENT DOCUMENTS

| EP | 1 130 527 | 9/2001 |
| JP | 2001-250438 A | 9/2001 |
| JP | 2001-251740 A | 9/2001 |
| JP | 2001-251741 A | 9/2001 |

OTHER PUBLICATIONS

EP Search Report dated Dec. 29, 2005 for EP 03 02 9087.
Drumheller Michael: "Constraint-based design of optimal transport elements" Proc Symp Solid Model Appl; Proceedings of the Symposium on Solid Modeling and Applications 2002, Jun. 17, 2002, pp. 401-412.

* cited by examiner

*Primary Examiner*—Albert W. Paladini
*Assistant Examiner*—Sheela S. Rao
(74) *Attorney, Agent, or Firm*—Sughrue Mion, PLLC

(57) ABSTRACT

A wire harness design aiding apparatus for designing a wire harness includes: a display unit for three dimensionally displaying an object on which the wire harness is to be arranged and the wire harness on a CAD display in a state that two points of the wire harness is constrained; a guide line setting unit for setting, based on a constraining direction of the wire harness with respect to the object, guide lines which are intersection points of a guide plane which is parallel to the wiring jig plate and extends passing the axial line of the main line and an outer surface of the main line, and displaying the guide line on the CAD display; and a branch line setting unit for branching out the branch line from a position on the main line in a direction along the guide plane.

10 Claims, 7 Drawing Sheets

CHECK A BRANCH LINE ANGULARLY SHIFTED UPWARD AND DOWNWARD FROM THE QUIDE PLANE BY 15°

SELECT DESIRED GUIDE LINE FROM WHICH BRANCH LINE IS BRANCHED OUT

SET BRANCHING ANGLE OF BRANCH LINE

BRANCHING ANGLE        BRANCHING ANGLE

CORRECT BRANCHING DIRECTION

WIRE HARNESS DESIGN AIDING APPARATUS, METHOD AND COMPUTER READABLE RECORDING MEDIUM STORING PROGRAM

BACKGROUND OF THE INVENTION

The present invention relates to an apparatus and a method for aiding in designing wiring paths of a wire harness arranged in a three dimensional space, and a computer readable recording medium storing a program thereof. More particularly, the invention relates to a wire harness design aiding apparatus and a method for making it easy to determine, for example, directions and angles of branch lines branched out from the main line of the wire harness.

In various types of electronic devices of vehicles and home-use electronic appliances, line members, such as wire harnesses, are used for interconnecting electric components or packages.

Such a wire harness is constructed such that a plurality of electric wires or communication wires are coupled together into a bundle by use of an appropriate protecting member, such as a tape, and connectors are attached to both ends or predetermined positions of the wire harness.

In the design works of the wire harnesses, a CAD (computer aided design) has been widely used from an early stage as to the design of the electric components and electronic packages itself.

A known apparatus for aiding in the design of line members such as wire harnesses is disclosed in JP-A-2001-250438.

The publication discloses an object of providing an apparatus and method for assisting wiring design of line members, which computes a realistic configuration of a wire harness by using simple setting items, and reports information on it, and computer readable storage medium. Further, to achieve the object, the publication discloses "A wire harness wiring design assisting apparatus having computing means for computing, based on a plurality of fixing positions and a deformation factor of line members which are input, a wiring configuration of a wire harness, which satisfies the fixing positions of the wire harness, and for providing information on the computation result, in which the computing means computes a bending rigid E of a target wire harness by a prescribed biquadratic function of a curvature $\rho$ of the wire harness based on a diameter $\phi$ of the wire harness, and computes a wiring configuration of the wire harness by using the computed bending rigid E."

Generally, a wire harness wired inside a vehicle body of an automobile or the like is directly or indirectly laid along a flat wiring jig plate and is manufactured so that a branch line is branched from a main line.

By the way, generally, a wire harness wired inside a vehicle body of such as an automobile or the like is directly or indirectly laid along a flat wiring jig plate and is manufactured so that a branch line is branched from a main line.

In manufacturing the wire harness for the automobile, it is necessary to set a length of the main line to a length suitable for a wiring path of the main line, and to branch out branch lines from a number of positions on the main line since the body of the automobile has a complicated three-dimensional structure.

When the wire harness is manufactured on the wiring jig plate, in view of efficiency of manufacturing, there is a demand for restricting branching directions of the branch lines to two directions which are parallel to the main line and the wiring jig plate.

In the wire harness for the automobile, bending forces, twisting forces and the like are applied to the main line according to the three dimensional structure of the vehicle body. Accordingly, if the branch line is designed so as to be branched out with the shortest path from the main line to the auxiliary device on a CAD display (3D), the branch lines are branched out from the main line in many directions when the wire harness is manufactured on the wiring jig plate.

Accordingly, in manufacturing the wire harness, it is required that the branch lines are branched out in proper directions and the branching angle of each branch line is determined in light of the bending and twisting of the main line so as to branch out the branch lines in two different directions along the wiring jig plate.

Note that the branch line is not always branched out so as to have the shortest distance. When the branch line is branched out in two different directions along the wiring jig plate in light of positional relation to the auxiliary device, the branch line may be somewhat detoured.

The term "branching angle of the branch line" means an angle between a virtual plane that is parallel to a plane direction of the wiring jig plate and passes an axial line of the main line, and an axial line of a branch line branched out from the outer surface of the main line, when a branch line is branched out from the main line on the flat wiring jig plate.

In the general manufacturing procedure, the orientation and the branching angle of the branch line branched out from the main line of the wire harness are determined based on designer's intuition and experience, and trial manufacturing is repeated. Accordingly, the product quality depends on designer's skill.

Where the related wiring path design aiding apparatus is used, it is impossible to design the branch line so as to be branched out in an appropriate direction, while taking the bending and twisting of the main line into consideration. As a result, a wire harness is manufactured in which a branching angle of a branch line branched out from the main line is not proper, and the wire harness does not conform in configuration to the complicated three-dimensional structure of the vehicle body.

Specifically, the following problem may occur. The branch line may be too short to reach the auxiliary component or the branch line may be too long to create a sag, and possibly interferes with the vehicle body and auxiliary component located therearound.

Thus, in manufacturing the wire harness for the automobile, when the related wiring path design aiding apparatus is used, it is difficult to determine a branching angle of the branch line suitable for the three-dimensional structure of the vehicle body.

SUMMARY OF THE INVENTION

Accordingly, an object of the present invention is to provide a wire harness design aiding apparatus and a method which is capable of determining a branching angle of a branch line so as to be suitable for a three-dimensional structure of a vehicle body, and a computer readable recording medium storing a program thereof.

In order to solve the aforesaid object, the invention is characterized by having the following arrangement.

The invention is directed to a wire harness design aiding apparatus for designing a wire harness including a main line and a branch line manufactured by using a wiring jig plate, the apparatus comprising:

a display unit for three dimensionally displaying an object on which the wire harness is to be arranged and the wire harness on a CAD display in a state that two points of the wire harness is constrained;

a guide line setting unit for setting, based on a constraining direction of the wire harness with respect to the object, guide lines which are intersection points of a guide plane which is parallel to the wiring jig plate and extends passing an axial line of the main line and an outer surface of the main line, and displaying the guide line on the CAD display; and a branch line setting unit for branching out the branch line from a position on the main line in a direction along the guide plane.

The branch line setting unit is capable of setting a branch line angle between the axial line of the main line and an axial line of the branch line extending along the guide plane.

A warning unit providing a warning when an inclination angle between an axial line of the branch line and the guide plane exceeds a predetermined angle.

In addition, an inclination angle correcting unit may be provided for correcting the inclination angle to the predetermined angle or smaller when the inclination angle exceeds the predetermined angle.

The invention is also directed to a method of aiding designing a wire harness including a main line and a branch line manufactured by using a wiring jig plate, the method comprising the steps of:

three dimensionally displaying, on a CAD display, an object on which the wire harness is to be arranged;

arranging the main line to the object on the CAD display;

constraining two points of the wire harness to the object;

setting, based on a constraining direction of the wire harness with respect to the object, guide lines which are intersection points of a guide plane which is parallel to the wiring jig plate and extends passing the axial line of the main line and an outer surface of the main line, displaying the guide line on the CAD display;

designating a desired position at which the branch line is branched out from the main line;

setting a branching angle between an axial line of the main line and an axial line of the branch line; and setting an inclination angle between the axial line of the branch line and the guide plane to a predetermined angle or smaller.

Additional steps may include:

checking as to if the inclination angle is equal to the predetermined angle or smaller; and correcting the inclination angle to the predetermined angle or smaller when the inclination angle exceeds the predetermined angle.

Yet additional steps may include:

urging a designer to select of one of the guide lines from which the branch line is to be branched out when the inclination angle exceeds the predetermined angle;

setting the branching angle to the predetermined angle or smaller; and correcting the branching angle so as to satisfy setting condition of the guide line selection and the branching angle.

The invention is also directed to computer readable recording medium storing a program which cause a computer to function as a wire harness design aiding apparatus which aids designing a wire harness including a main line and a branch line manufactured by using a wiring jig plate and executes the steps described above.

DETAILED DESCRIPTION OF PREFERRED EMBODIMENTS

Now, an embodiment according to the present invention will be described with reference to the accompanying drawings.

Figure 1:
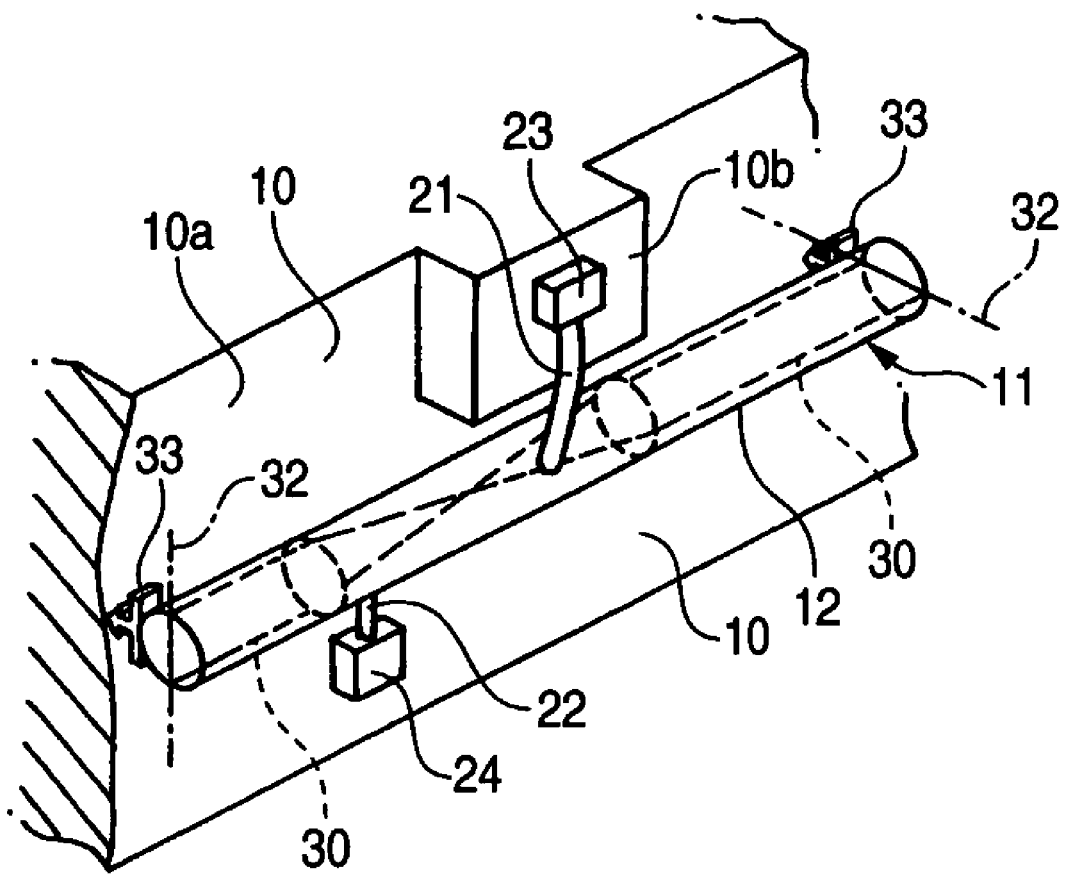
FIG. 1 is a diagram showing a state that a main line 1 is three dimensionally fixed to a vehicle body containing stepped parts at two positions by means of clamps on a CAD display.

A wire harness 11 wired between two points and laid along a body 10 of an automobile is displayed on a CAD display shown in FIG. 1.

On the CAD display, a main line 12 forming the wire harness 11 is arranged along a flat surface 10a of the vehicle body 10, and clamped to the vehicle body 10 by clamps 33 at two points spaced from each other by a predetermined distance in a longitudinal direction of the main line 12. Further, a first branch line 21 and a second branch line 22 are branched from the main line between those two points at which the wire harness is clamped by the clamps 33.

In the instant embodiment, the clamp is used for clamping the main line 12. If required, any other appropriate means other than the clamp may be used if it is capable of clamping the main line 12 in some way. An example of such is a connector.

A first branch line 21 is connected to a first electric component 23 located on a protruded part 10b protruded from the flat surface 10a of the vehicle body 10, through a connector (not shown). A second branch line 22 is connected to a second electric component 24 located on the flat surface 10a of the vehicle body 10, through a connector (not shown).

Further, two guide lines 30 are displayed which longitudinally extend along the peripheral surface of the main line 12, as shown in FIG. 1.

Figure 2A:
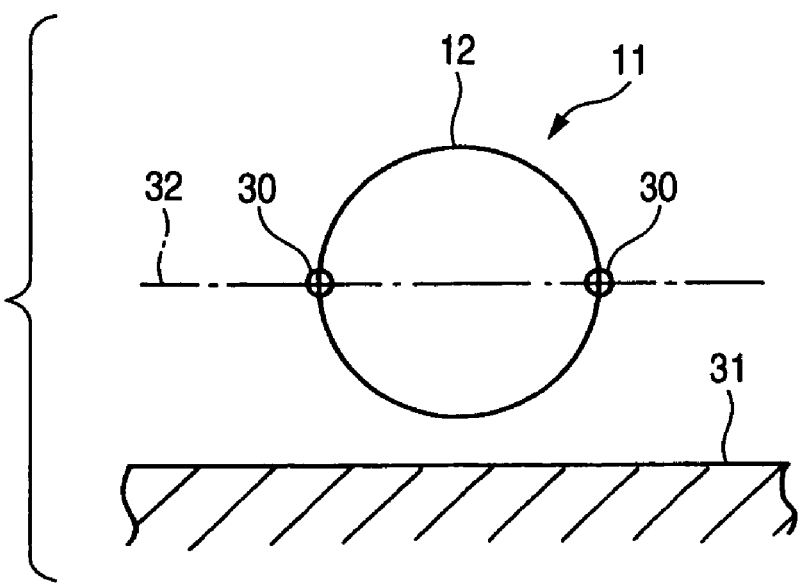
FIGS. 2A and 2B are model diagrams showing a relationship among a wiring jig plate, a main line of a wire harness, guide plane, guide lines, and clamps.

As shown in FIG. 2A, the guide lines 30 are lines which connect, in a longitudinal direction of the main line 12, intersection points of a virtual guide plane 32 which is parallel to a wiring jig plate 31 used when the wire harness 11 is actually manufactured and extends so as to pass the axial line of the main line 12, and the peripheral surface of the main line. Two guide lines, indicated by, for example, dotted lines, are displayed on the peripheral surface of the main line 12 on the CAD display (see FIG. 1).

Figure 2B:
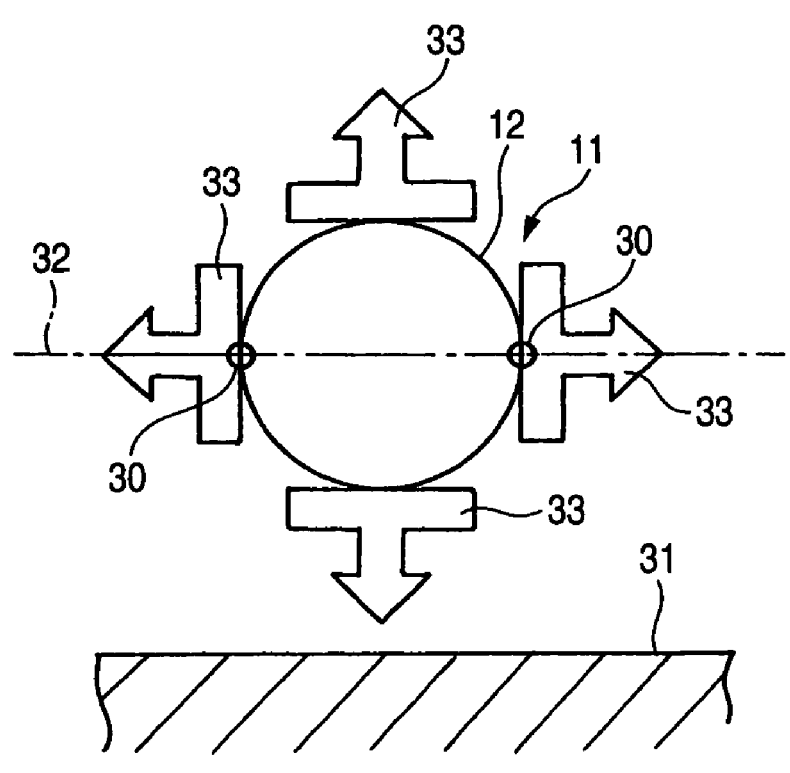

As shown in FIG. 2B, when the wire harness 11 is actually manufactured, in view of mainly workability on the wiring jig plate 31, the clamp 33 which is clamped to a predetermine position of the main line 12 is attached to the main line 12 at a position which is selected from a total of four positions; two positions as viewed in a direction along the guide plane 32 and two positions as viewed in a direction perpendicular to the guide plane 32.

Accordingly, the two guide lines 30 on the CAD display are set on the basis of the positions of the clamps 33, viz., the clamping directions of the main line 12 with respect to the vehicle body 10.

Figure 3A:
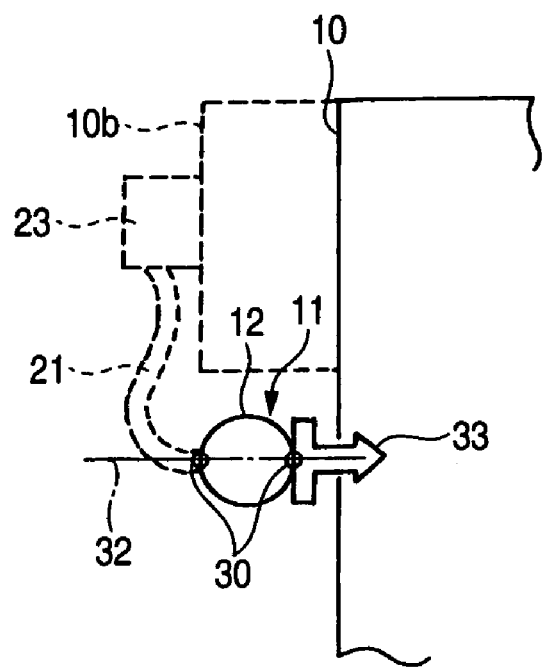
FIGS. 3A and 3B are model diagrams showing a relationship among a main line of a wire harness, guide plane, guide lines, and clamps at a clamping position in FIG. 1.
Figure 3B:
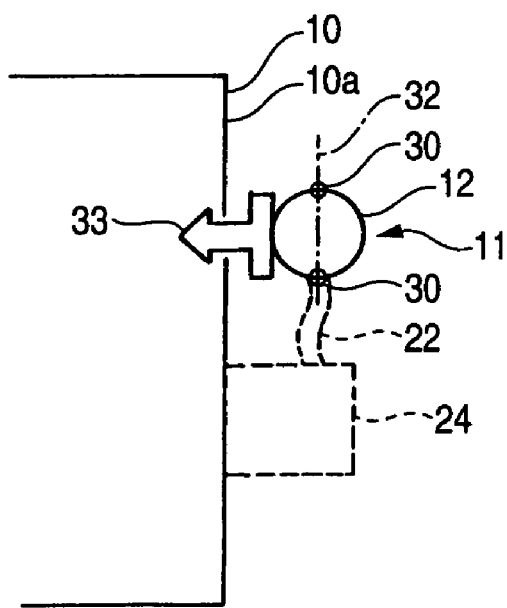

FIGS. 3A and 3B show relationships between the first branch line 21 and the second branch line 22 which are branched out from the guide plane 32, and the first electric component 23 and the second electric component 24 to which the first and second branch lines 21 and 22 are connected through connectors (not shown).

In FIGS. 3A and 3B, the first and second electric components 23 and 24 and the first and second branch lines 21 and 22, which are indicated by dotted lines, are located on the inner side than the clamps 33 in the drawing.

As shown in FIG. 3A, in the vicinity of a position where the first branch line 21 is branched out, the clamp 33 is attached in a direction along the guide plane 32, and the first branch line 21 is branched out in a direction along the guide plane 32.

As shown in FIG. 3B, in the vicinity of a position where the second branch line 22 is branched out, the clamp 33 is mounted in a direction perpendicular to the guide plane 32, and the second branch line 22 is branched out in a direction along the guide plane 32.

Thus, in the wire harness design aiding apparatus constructed according to the invention, it is required to branch out the first branch line 21 and the second branch line 22 along the guide plane 32 from the main line 12. However, in actual devices, some tolerable inclination of each branch line to the guide plane is permitted.

Specifically, under the assumption that when the first branch line 21 and the second branch line 22 are branched out from the main line 12 in a state that those branch lines extend along the guide plane 32, an angle between each branch line and the guide plane is 0°, when an inclination angle as an angle between the axial line of the first branch line 21 or the second branch line 22 and the guide plane 32 exceeds a predetermined angle, it is determined that the branching state is unacceptable and a warning is given. When the inclination angle is within the predetermined angle, it is judged that the inclination angle is within the tolerable range, and the inclination of the branch line is permitted (OK).

Figure 4:
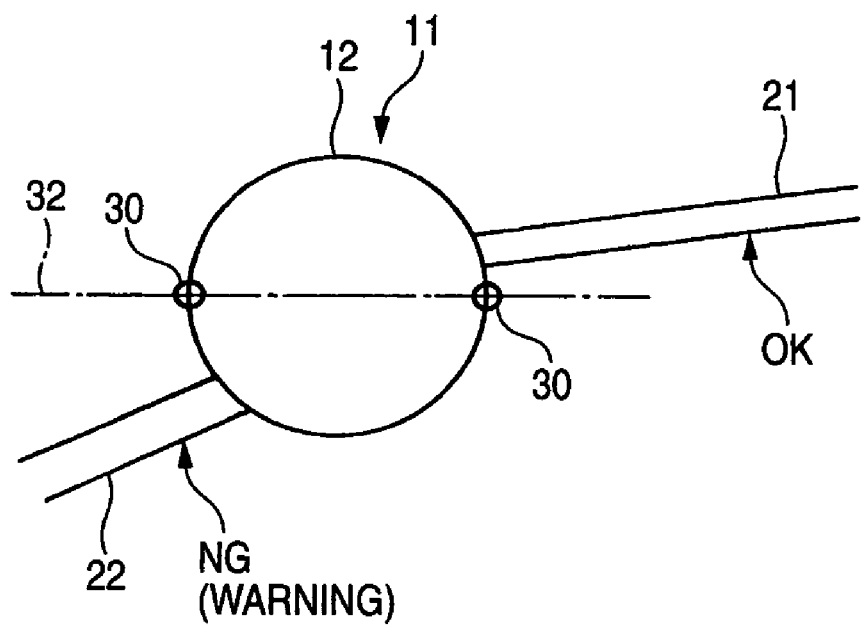
FIG. 4 is a diagram showing acceptable (OK) and unacceptable (NG) branch lines to the guide (plane), which are formed to the main line on the CAD display.

Specifically, in the case of FIG. 4, an inclination of the first branch line 21 to the guide plane 32 is permitted, but an inclination of the second branch line 22 is not permitted, and the warning is given.

As seen from FIG. 1, the guide lines 30 that are set with respect to the positions of the clamps 33 are set spirally and along the peripheral surface of the main line 12.

As a result, if the first and second branch lines 21 and 22 are branched out so as to extend along the guide plane 32 within the tolerable inclination angle, when the first branch line 21 and the second branch line 22 are actually branched out from the main line 12 on the wiring jig plate 31, the first and second branch lines 21 and 22 can be branched out in two different directions that are parallel to the wiring jig plate 31 without deteriorating the workability. Further, when the manufactured wire harness 11 is arranged on an actual vehicle body 10, the following problems do not arise: a problem that the first branch line 21 and/or the second branch line 22 is too short to reach the first electric component 23 and/or the second electric component 24; and another problem that the first branch line 21 and/or the second branch line 22 is too long and sagged, and possibly interferes with another electric component located therearound.

A procedure of branching out the first branch line 21 and the second branch line 22 from the main line 12 on the CAD display will be described by using a flow chart of FIG. 5.

To start, necessary data is read out, and a desired part of a vehicle body 10 on which a wire harness 11 is to be arranged is displayed on the CAD display according to an instruction by an operator. Then, a layout of, for example, a first electric component 23 and a second electric component 24 which relate to the displayed part of the vehicle body is three dimensionally displayed on the screen (step S1).

Connectors (not shown) for connecting the wire harness 11 to positions of the auxiliary components displayed on the screen are located at necessary positions (step S2).

A main line 12 of the wire harness 11 is formed by connecting one connector to another connector which are arranged in the step S2 (step S3).

At this time, an operation of forming a wiring path of the main line 12 and an operation of forming wiring paths of the first and second branch lines 21 and 22 are separately performed.

Specifically, two positions of the main line 12 formed in the step S3, which are longitudinally spaced apart from each other, are fixed to the vehicle body 10 by clamps 33 (step S4).

The clamps 33 and the connectors may be of the type in which the positions of the main line 12 at which the main line is clamped are rotatable or not rotatable, and other suitable types of them may be used.

To prevent that the main line 12 of the wire harness 11 is vibrated to swing and interfere with the vehicle body 10, the main line 12 of the wire harness 11 is fixed to the vehicle body 10 by the clamps 33.

Subsequently, the first branch line 21 and the second branch line 22 are branched out from the guide lines 30 between the two points on the main line 12 formed in the steps S3 and S4 at which the main line 12 is clamped by the clamps 33. A layout of the first branch line 21 and the second branch line 22 are edited so that the wiring paths of those branch lines arranged to the first electric component 23 and the second electric component 24 do not interfere with the auxiliary components and the vehicle body, located therearound (step S5).

Those steps S3 to S5 thus ordered in execution may be executed in another order, if required, and executions of those steps substantially concurrently progress.

A covering (tape, tube, sheet, or the like) is formed in order to protect the wires that are contained in the main line of the wire harness and the first and second branch lines 21 and 22 (step S6).

Next, after the step S6 is executed, the computer checks if the first branch line 21 and the second branch line 22 are valid with respect to the main line 12 (step S7).

In the branch line validity check of the step S7, it is mainly checked whether the axial line of the first branch line 21 and the second branch line 22 are branched out along the guide plane 32, viz., whether or not an inclination angle as an angle between the axial line of the first branch line 21 or the axial line of the second branch line 22 and the guide plane 32 is within the tolerable angle.

The step of checking the branch line validity may additionally check as to if the formed wire harness 11 interferes with the vehicle body 10 and the auxiliary components located therearound and if other manufacturing requirements are satisfied.

The manufacturing requirement check contains the following check items:
to check as to if a clamp is present within a predetermined range of distance longitudinally measured from the branched part, on the main line.
check as to if a clamp-to-clamp distance is within a predetermined distance.
check as to if a distance between the adjacent branching parts is within a predetermined distance.
check as to if the number of branching parts is selected to be within a predetermined number of branching parts.

If the answer to the step S7 is YES, viz., the inclination angle is within the tolerable range, the formed CAD data is output (step S9).

If the answer to the step S7 is NO, viz., the inclination angle is not within the tolerable range, the computer automatically corrects it in a step S8 and then advances to the step S9 or automatically corrects it in the step S8 and then returns to the step S4 where the position of, for example, the clamp is changed to another position and a wiring path is formed anew, and the branch line validity check is made again.

A decision procedure in the step S7 in FIG. 5 will be described with reference to FIG. 6.

To begin with, two guide lines 33 based on the guide plane 32 arranged parallel to the wiring jig plate 31 are set on the peripheral surface of the main line 12 (step S71).

Subsequently, it is checked whether or not the first branch line 21 and the second branch line 22 are branched out along the guide plane 32 or whether or not those are branched out at within a predetermined angle with respect to the guide plane 32, viz., whether or not the inclination angle is acceptable (step S72).

If the answer to the step S72 is YES (no error is present), viz., the inclination angle is within the tolerable range, the computer advances to the step S9.

If the answer is NO (error is present), the inclination angle is out of the tolerable range, an error part is displayed on the CAD display (step S81), and then the error part is corrected so as to satisfy the condition (step S82), and the step S9 is executed.

Next, a decision procedure in the step S8 in FIG. 6 and the contents of a CAD display will be described with reference to FIGS. 7 to 8C.

Figure 7:
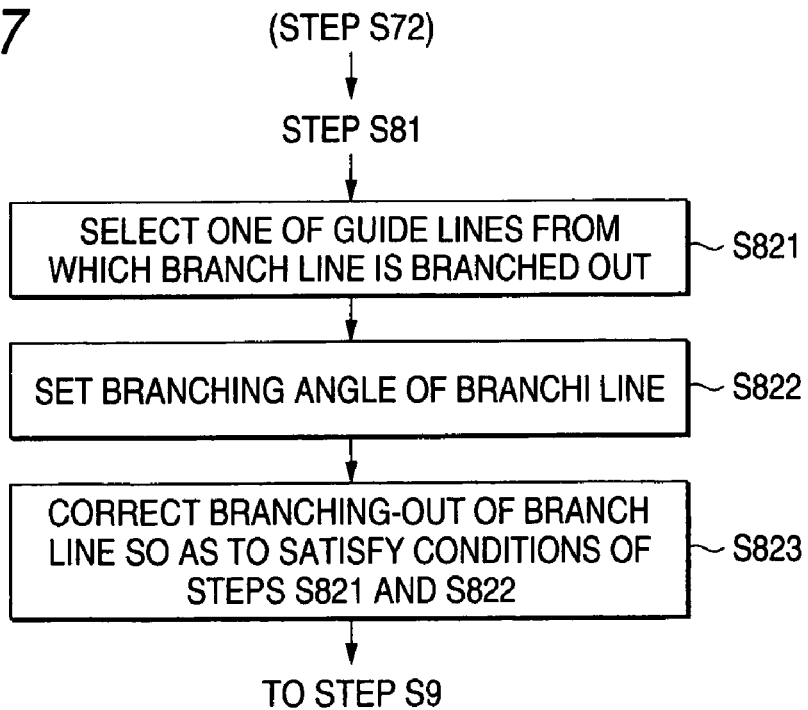
FIG. 7 is a flow chart showing the details of step S8 in the wire harness branching-out procedure.

As shown in FIG. 7, in the step S82, the computer urges an operator to select one of the guide lines from which the first branch line 21 or the second branch line 22 is to be branched out (step S821).

Figure 8A:
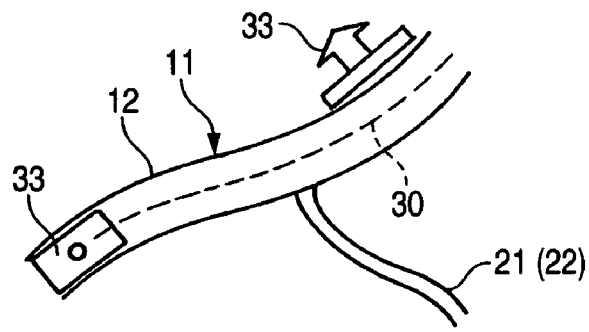
FIGS. 8A to 8C are diagrams showing a correcting operation of a branching angle of a branch line with respect to the guide as is indicated on the CAD display.

The content of a CAD display in this situation is shown in FIG. 8A.

Then, the computer urges the operator to set a branching angle of the branch line, viz., an angle between the axial line of the main line 12 and the first branch line 21 or the second branch line 22 that extends along the guide plane 32 (step S822).

Figure 8B:
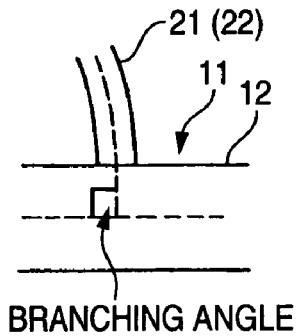
Figure 8B:
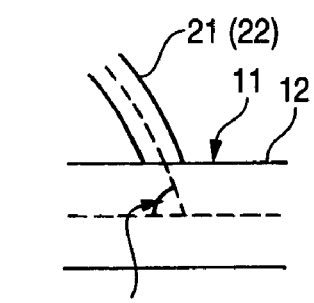

The content of the CAD display in this situation is shown in FIG. 8B.

And, the computer automatically corrects the branching out of the first branch line 21 or the second branch line 22 so as to satisfy the conditions of the steps S821 and S822 (step S823), and advances to the step S9.

Figure 8C:
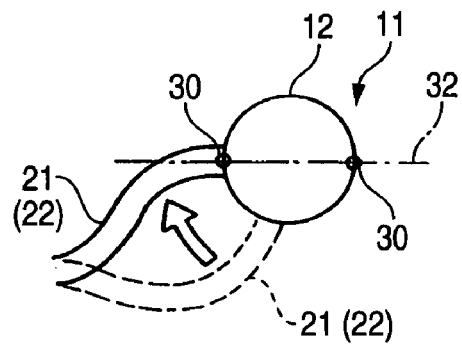

The content of the CAD display in this situation is shown in FIG. 8C. In FIG. 8C, the first branch line 21 or the second branch line 22 that is error is indicated by dotted lines, and the first branch line 21 or the second branch line 22 that is automatically corrected is indicated by solid lines.

Figure 5:
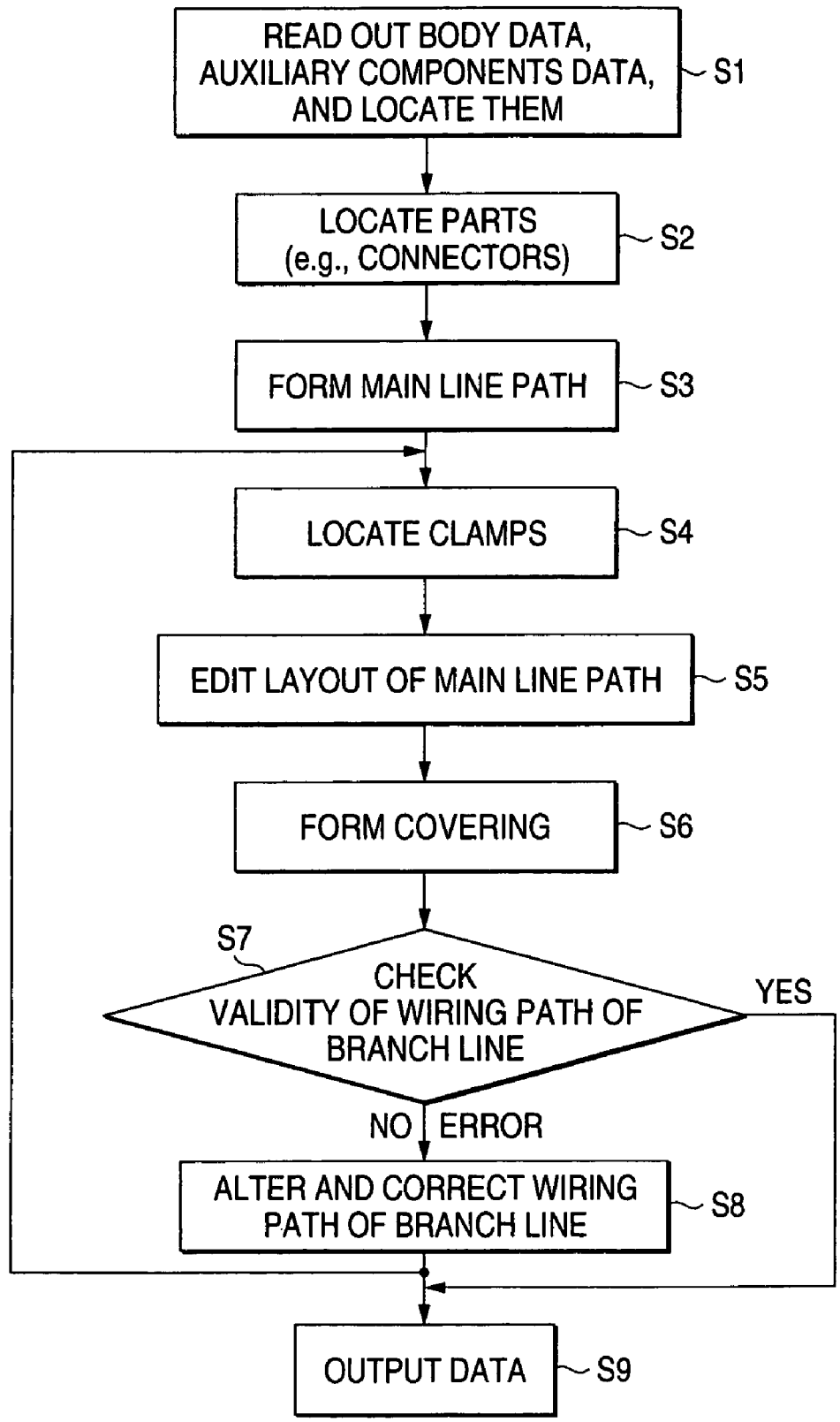
FIG. 5 is a flow chart showing a branching-out procedure of a wire harness which is executed using a CAD apparatus.
Figure 6:
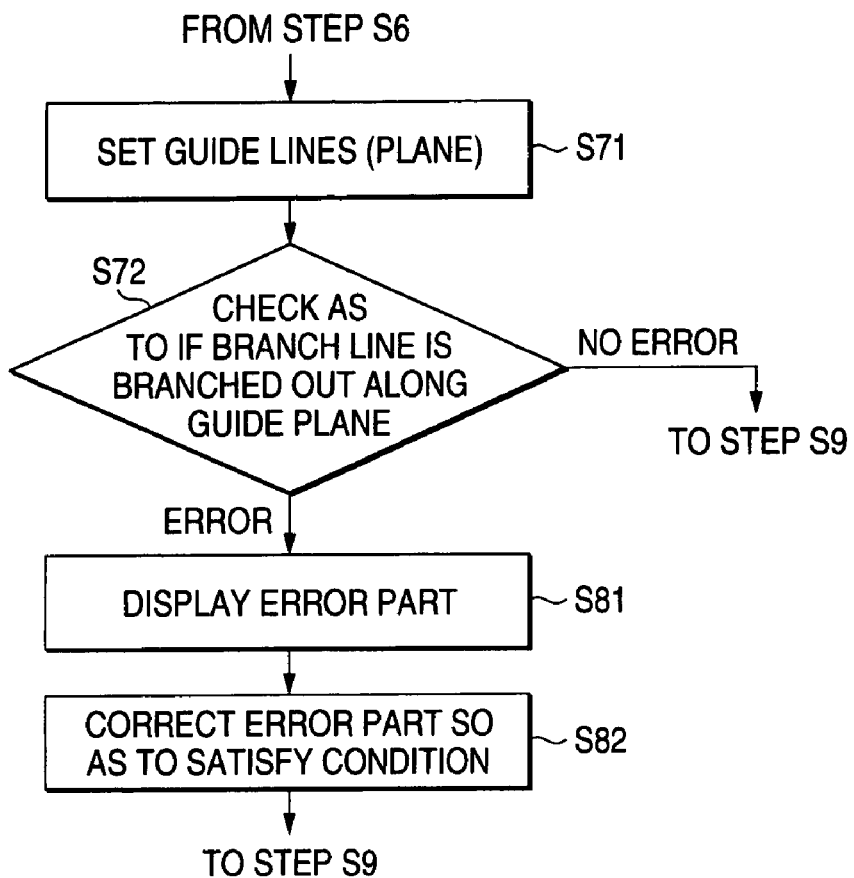
FIG. 6 is a flow chart showing the details of steps S7 and S8 in the wire harness branching-out procedure.

In the invention, there is no need of time sequentially executing the steps S3 to S5 separately from the flow chart in FIG. 5, but those steps may be executed concurrently. Further, for example, the check of the branching direction of the branch line may also be executed concurrently with the executions of the steps S3 to S5, and the final check may be omitted.

Further, the present invention is not limited to the above described wire design aiding apparatus and the wire design aiding apparatus and the present invention can be realized by a computer readable recording medium which stores a program which causes a computer to function as the wire design aiding apparatus when the program is installed in the computer.

The present invention provides a wire harness design aiding apparatus for executing a design of branching out branch lines from a main line of a wire harness. In the wire harness design aiding apparatus, a display unit for displaying the main line on a CAD display on which an object on which the wire harness is to be arranged is three dimensionally displayed comprises: means for clamping the main line at two points; guide line setting means for displaying, on the surface of the main line, intersection points of a guide plane which is parallel to a wiring jig plate used for manufacturing the wire harness and extends passing the axial line of the main line, and the surface of the main line in the form of guide lines, and for setting the guide lines on the basis of the clamping directions with respect to the vehicle body; and branch line setting means for branching out the branch line from a position on the main line as is designated in a direction along the guide plane. With such an arrangement, the wire harness design aiding apparatus is able to branch out a branch line conforming with a configuration of the vehicle body even when the main line of the wire harness is, for example, twisted.

In the wire harness design aiding apparatus, the branch line setting means is able to setting a branch line angle between an axial line of the main line and an axial line of the branch line extending along the guide plane. Therefore, design freedom is enhanced.

The wire harness design aiding apparatus further comprises warning means for giving a warning when an inclination angle as an angle between the axial line of the branch line and the guide plane exceeds a predetermined angle. This feature enables a tolerable range in design to be kept constant.

The wire harness design aiding apparatus further comprises inclination angle correcting means for correcting the inclination angle to the predetermined angle or smaller when the inclination angle exceeds the predetermined angle. This feature enhances an accuracy of design.

The invention further provides a wire harness design aiding method comprising the steps of: arranging a main line of the wire harness on a CAD display on which an object on which the wire harness is to be arranged is three dimensionally displayed, corresponding to the object; clamping predetermined two positions on the main line to corresponding three-dimensional positions on the object; displaying intersection points of a guide plane which is parallel to a wiring jig plate used for manufacturing the wire harness and extends passing an axial line of the main line, and the surface of the main line in the form of guide lines on the surface of the main line, and setting the guide lines on the basis of the clamping directions with respect to the object; designating a desired position at which a branch line is branched out from the main line in a direction along the guide plane; setting a branching angle as an angle between the axial line of the main line and the axial line of the branch line along the guide plane; and setting an inclination angle as an angle between the axial line of the branch line and the guide plane to a predetermined angle or smaller. This unique feature enables a designer to design a wire harness in which a branch line conforming with a configuration of the vehicle body may be branched out even when the main line of the wire harness is, for example, twisted.

The wire harness design aiding method further comprises: checking as to if the inclination angle is equal to the predetermined angle or smaller; and correcting the inclination angle to the predetermined angle or smaller when the inclination angle exceeds the predetermined angle. This feature enhances reliability of design aiding.

The wire harness design aiding method further comprises: requiring selection of one of the guide lines from which the branch line is to be branched out when the inclination angle exceeds the predetermined angle; setting the branching angle to the predetermined angle or smaller; and correcting the branching angle so as to satisfy the guide line selection and the branching angle setting condition. This feature enhances an accuracy of design.

What is claimed is:

1. A wire harness design aiding apparatus for designing a wire harness including a main line and a branch line manufactured using a wiring jig plate, the apparatus comprising:
   a CAD display unit for three dimensionally displaying an object on which the wire harness is to be arranged and the wire harness in a state that two points of the wire harness are constrained;
   a guide line setting unit for setting, based on a constraining direction of the wire harness with respect to the object, guide lines which are intersection points of a guide plane which is parallel to the wiring jig plate and extends past an axial line of the main line and an outer surface of the main line, and displaying the guide line on the CAD display; and
   a branch line setting unit for setting the branching out of the branch line from a position on the main line in a direction along the guide plane.

2. The apparatus according to claim 1, wherein the branch line setting unit is capable of setting a branch line angle between the axial line of the main line and an axial line of the branch line extending along the guide plane.

3. The apparatus according to claim 1 further comprising a warning unit for giving a warning when an inclination angle between an axial line of the branch line and the guide plane exceeds a predetermined angle.

4. The apparatus according to claim 3 further comprising an inclination angle correcting unit for correcting the inclination angle to the predetermined angle or smaller when the inclination angle exceeds the predetermined angle.

5. A method of aiding designing a wire harness including a main line and a branch line manufactured by using a wiring jig plate, the method comprising the steps of:
   three dimensionally displaying, on a CAD display, an object on which the wire harness is to be arranged;
   arranging the main line to the object on the CAD display;
   constraining two points of the wire harness to the object;
   setting, based on a constraining direction of the wire harness with respect to the object, guide lines which are intersection points of a guide plane which is parallel to the wiring jig plate and extends passing the axial line of the main line and an outer surface of the main line,
   displaying the guide line on the CAD display;
   designating a desired position at which the branch line is branched out from the main line;
   setting a branching angle between an axial line of the main line and an axial line of the branch line; and
   setting an inclination angle between the axial line of the branch line and the guide plane to a predetermined angle or smaller.

6. The method according to claim 5 further comprising the steps of:
   checking as to if the inclination angle is equal to the predetermined angle or smaller; and
   correcting the inclination angle to the predetermined angle or smaller when the inclination angle exceeds the predetermined angle.

7. The method according to claim 6 further comprising:
   selecting one of the guide lines from which the branch line is to be branched out when the inclination angle exceeds the predetermined angle;
   setting the branching angle to the predetermined angle or smaller; and
   correcting the branching angle so as to satisfy setting condition of the guide line selection and the branching angle.

8. A computer readable recording medium storing a program which cause a computer to function as a wire harness design aiding apparatus which aids designing a wire harness including a main line and a branch line manufactured by using a wiring jig plate and executes the steps of:
   three dimensionally displaying, on a CAD display, an object on which the wire harness is to be arranged;
   arranging the main line to the object on the CAD display;
   constraining two points of the wire harness to the object;
   setting, based on a constraining direction of the wire harness with respect to the object, guide lines which are intersection points of a guide plane which is parallel to the wiring jig plate and extends passing the axial line of the main line and an outer surface of the main line,
   displaying the guide line on the CAD display;
   designating a desired position at which the branch line is branched out from the main line;
   setting a branching angle between an axial line of the main line and an axial line of the branch line; and
   setting an inclination angle between the axial line of the branch line and the guide plane to a predetermined angle or smaller.

9. The recording medium according to claim 8, wherein the recording medium causes the computer to further execute the steps of:
   checking as to if the inclination angle is equal to the predetermined angle or smaller; and
   correcting the inclination angle to the predetermined angle or smaller when the inclination angle exceeds the predetermined angle.

10. The recording medium according to claim 9, wherein the recording medium causes the computer to further execute the steps of:
    urging a designer to select of one of the guide lines from which the branch line is to be branched out when the inclination angle exceeds the predetermined angle;
    setting the branching angle to the predetermined angle or smaller; and
    correcting the branching angle so as to satisfy setting condition of the guide line selection and the branching angle.

* * * * *